United States Patent Office 3,072,588
Patented Jan. 8, 1963

3,072,588
METHOD OF PREPARING AQUEOUS LATEX OF HIGH MOLECULAR WEIGHT VINYLBENZYL HALIDE POLYMER AND RESULTING PRODUCT
John F. Vitkuske, Midland, and Fred C. Rutledge, Auburn, Mich., assignors to The Dow Chemical Company, Midland, Mich., a corporation of Delaware
No Drawing. Filed Oct. 13, 1958, Ser. No. 766,711
8 Claims. (Cl. 260—29.6)

This invention concerns a method for making high molecular weight linear and lightly crosslinked homopolymers and copolymers of vinylbenzyl halide, halide being inclusive of chloride and bromide, and the products thereof.

Fine particles size high molecular weight polymeric vinylbenzyl halides, both linear and crosslinked with up to about 1 percent crosslinking agent such as divinylbenzene, ranging in average particle diameter from about 200 A. to about 3000 A. and having molecular weights ranging between about 20 million and 10 billion for the crosslinked polymers and having intrinsic viscosities of about 0.9 to about 2.5 for linear polymers have heretofore been unknown. They form the subject matter of this invention. The lightly crosslinked products are referred to herein as microgels.

The high molecular weight polymeric products of this invention are prepared by emulsion polymerizing an oil-in-water emulsion containing between about 5 to 50 weight percent of a monomer mixture of about 0.00 to about 1 weight percent of divinylbenzene (DVB), at least 5 percent vinylbenzene halide, and a balance of one or more monoalkenyl alkyl or aryl comonomers, inclusive of styrene and monoalkenyl monomers copolymerizable with styrene, about 0.5 to 10 weight percent of a synthetic organic, anionic, pH stable emulsifier, monomer basis, about 0.1 to 1 weight percent of a water soluble peroxy initiator, monomer basis, a weight equivalent of a water soluble reducing activator, initiator basis, the balance being water. The polymerization temperature is varied between about 0° and 30° C., preferably between 10° and 30° C. Above 30° C., appreciable agglomeration takes place and relatively low molecular weight products result, while below 0° C., the polymerization rate is impractical. The polymerization time, dependent upon the temperature, is varied between about 2 to 60 hours. Below a two hour polymerization time, conversion to polymer is low, while polymerization times above 60 hours are impractical.

Suitable synthetic, anionic, pH stable emulsifiers useful in the practice of this invention include all anionic emulsifiers exclusive of conventional soaps, such as the alkyl aryl sulfonates, e.g., $C_{12}H_{25}C_6H_4SO_3Na$, the alkyl aryl polyether sulfonates, the fatty alkyl sulfates, e.g.,

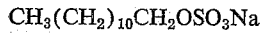

the sulfonated fatty amides, e.g.,

and the sulfated fatty amides. Wide variation is, of course, possible within each class of the foregoing because of configuration, chain length and number and degree of saturation of the hydrocarbon group.

Suitable water soluble peroxy initiators include $K_2S_2O_8$, $Na_2S_2O_8$, $(NH_4)_2S_2O_8$, $H_2O_2$ and its complexes, etc. Suitable water-soluble reducing activators include conventional alkali metal pyrosulfites, alkyl mercaptans, alkali metal formaldehyde sulfoxylates, alkali metal sulfites, alkali metal bisulfites, etc.

A monomer mixture containing from 0.00 to 1 weight percent of a crosslinking agent, from 100 to 5 weight percent of vinylbenzyl halide, the balance being styrene or a monoalkenyl alkyl or aryl monomer copolymerizable with styrene, e.g., alkyl styrenes, acrylonitrile, acrylate and methacrylate esters, etc., is used.

In practice, the monomers are weighed into a clean reactor containing a mixture of water, preferably deionized, emulsifier and initiator. The ingredients are then cooled, advantageously to about 0° C., and the reducing activator is then added. The reactor is then purged with a gas, e.g., purified nitrogen to displace air, and then sealed. The reactor contents are then agitated, for 16 hours, for example, while being maintained at 30° C. A coagulum-free linear or microgel latex is thereby obtained, useful as such. When recovered as a dry solid by spray drying in an inert atmosphere, and maintained in an inert atmosphere, or by freeze coagulating, water washing, washing with methanol, ethanol or isopropanol and drying at a low temperature, advantageously below about 50° C., and maintained in an inert atmosphere, the product is stable and dispersible in organic solvents. When the microgel is dried at temperatures above 50° C. or exposed to air or oxygen, the product is less stable and gradually becomes non-dispersible in organic solvents.

The products of this invention, both in dry and latex forms, are useful as resinous binders and thickeners when dispersed in aromatic hydrocarbon solvents and mixtures thereof with chlorinated solvents such as methylene chloride. Such compositions make good paint removers. They are also useful as intermediates in making the water soluble polymers of U.S. patent application, Serial No. 738,939, filed June 2, 1958.

The following examples are in illustration of and not in limitation of the invention, which is defined in the claims. The molecular weights of the lightly cross-linked polymers (microgels) which follow have been determined to range between 20 million and 10 billion, based on particular mass, as calculated from the electron micrograph diameter, density, and the assumption (supported by viscosity behavior) that there is only one molecule per particle in the presence of appreciable cross-linking agent.

Example I

A quantity of 80 g. of vinylbenzyl chloride (inhibitor-free) containing 0.1 weight percent DVB was weighed into a clean bottle containing 150 ml. deionized water, 14.2 ml. of Triton X-200 (a 28 percent active Na salt of alkyl aryl polyether sulfonate) and 9.6 ml. of aqueous 5 percent $K_2S_2O_8$. The ingredients were cooled in an ice bath for one hour after which 6.8 ml. of aqueous 5 percent $Na_2S_2O_5$ was added. The bottle contents were then purged with prepurified nitrogen for 20 minutes in an ice bath and the bottle was sealed with a crown cap closure. The bottle was then placed in a tumbler at 30° C. and agitated at 12 r.p.m. for 16 hours. A coagulum-free latex was obtained in quantitative conversion of monomer to polymer. Polymer particles having a diameter of 700 A. as measured from electron micrographs, were obtained.

Example II

The procedure of Example I was repeated with a series of similar formulations including 80 g. of vinylbenzyl chloride and containing 0.00, 0.05, 0.3 and 1 weight percent DVB, respectively. Other variations included the use of 20 ml. of aqueous 20 percent sodium lauryl sulfate in place of Triton X-200, the addition of 9.6 ml. of aqueous 5 percent sodium bicarbonate and a quantity of 175 ml. of water. In other respects the formulations and procedure were as in Example I. Coagulum-free latexes were obtained in each case. Conversion to polymer was quantitative. The average particle diameter of each of the 4 latexes was about 600 A.

Example III

The procedure of Example II was repeated, substituting 0.5 (A), 1 (B) and 2 weight percent of polyalkyl sodium phosphate (C), monomer basis, in place of the Triton X–200. The latexes so obtained had the following average particle diameters and amounts of coagulum.

| | Coagulum percent | Particle size, A |
|---|---|---|
| A | ca. 0.2 | 2460 |
| B | do. | 2320 |
| C | less than 0.1 | 1580 |

Example IV

The procedure of Example II was repeated, with the differences as noted in the following table.

| Emulsifier, percent monomer basis | Weight percent monomers | Coagulum, percent [1] | Polymerization schedule | Particle size, A. |
|---|---|---|---|---|
| Na lauryl sulfate | 75 VBC,[2] 25 styrene | None | 16 hrs. at 30° C | |
| Do | 50 VBC, 50 styrene | None | do | |
| Do | 100 VBC | None | do | 570 |
| Do | 99 VBC, 1 acrylic acid | 1 | 18 hrs. at 30° C | |
| Do | 90 VBC, 10 VCN [3] | 6 | do | |
| Do | 75 VBC, 25 VCN | 0.3 | do | |
| Do | 50 VBC, 50 VCN | None | do | |
| Do | 90 VBC, 10 methyl acrylate | 5 | do | |
| Do | 75 VBC, 25 methyl acrylate | 0.1 | do | |
| Do | 50 VBC, 50 methyl acrylate | None | do | |
| Do | 25 VBC, 75 methyl acrylate | None | do | |
| Do | 90 VBC, 10 VCN | 0.2 | 16 hrs. at 30° C | 750 |
| Do | 75 VBC, 25 VCN | None | do | 770 |
| Do | 50 VBC, 50 VCN | None | do | 950 |
| Do | 95 VBC, 5 acrylamide | 1 | do | 600 |
| Do | 90 VBC, 10 acrylamide | <0.1 | do | 570 |
| Do | 80 VBC, 20 acrylamide | Ca. 5 | do | 530 |
| Do | 70 VBC, 30 acrylamide | Ca. 5 | do | |
| Do | 99 VBC, 1 acrylic acid | None | do | 720 |
| Do | 98 VBC, 2 acrylic acid | 5 | do | 605 |
| Do | 97 VBC, 3 acrylic acid | 3 | do | 540 |
| 1.0 Aerosol OT plus 2 Triton X 301 | 55 styrene, 40 butadiene, 5 VBC | None | 40 hrs. at 40° C | 1,000 |
| Do | 50 styrene, 40 butadiene, 10 VBC | 0.3 | do | 970 |
| Do | 40 styrene, 40 butadiene, 20 VBC | 1.7 | do | 940 |

[1] Coagulum formed during polymerization and removed by filtering latex through varnish filter.
[2] VBC=Vinylbenzyl chloride.
[3] VCN=$CH_2$:CHCN.

NOTE.—Aerosol OT=Dioctyl ester of sodium sulfosuccinate. Triton X 301=Sodium alkyl aryl polyether sulfate.

Example V

A series of linear polymers of vinylbenzyl chloride was prepared by the procedure of Example II wherein no DVB was present but in which varying amounts of dodecyl mercaptan (designated as DDM) were present. Viscosity data are given in the following table.

| Weight percent DDM monomer basis | Viscosity of 2 weight percent polymer solution in toluene, cps. |
|---|---|
| 0.001 | 9.62 |
| 0.003 | 5.34 |
| 0.01 | 4.85 |
| 0.03 | 3.58 |
| 0.1 | 2.12 |
| 0.3 | 1.40 |
| none (1) | 8.82 |

(1) Solutions of this sample in toluene were dilatant and therefore it is felt that the polymer was crosslinked (possibly by monomer impurities) and was behaving as a microgel.

Example VI

The procedure of Example II was repeated for a series of formulations with no DVB, but with increasing amounts of tert-dodecylmercaptan from 0.01 to 0.1 percent. The polymers were separated by taking 30 ml. of latex adding 150 ml. of toluene and several ml. of methanol and shaking to solution. Polymer was then precipitated with excess methanol, the excess methanol solution was decanted, and the precipitated polymer was redissolved in 400 ml. of toluene with agitation. The solution in toluene was added dropwise to 4 liters of methanol with vigorous stirring. The polymer separated out as a finely divided precipitate which was filtered off and dried at room temperature under vacuum. It was found that increasing the amount of tert-dodecylmercaptan from 0.01 to 0.1 percent decreased the intrinsic viscosity of the polymer in ethylbenzyl chloride from 2.10 to 0.96 using the Ubbelohde solution viscometer method.

What is claimed is:

1. A method for making an aqueous latex of a high molecular weight polymeric vinylbenzyl halide of the group consisting of linear and crosslinked polymers, halide being a member of the group consisting of chloride and bromide, comprising heat reacting at a temperature between about 10° and 30° C. in an inert atmosphere an oil-in-water emulsion containing between about 5 and about 50 weight percent, emulsion basis, of monomer of the group consisting of (a) vinylbenzyl halide; (b) at least about 5 weight percent of vinylbenzyl halide, the balance being at least one monoalkenyl monomer of the group consisting of styrene and monoalkenyl monomers copolymerizable with styrene; and (c) mixtures of one of (a) and (b) with up to 1 weight percent of a crosslinking agent containing two vinylidene groups, in the presence of about 0.5 to about 10 weight percent, monomer basis, of a synthetic organic, pH stable, anionic emulsifier, about 0.1 to about 1 weight percent, monomer basis, of a water-soluble peroxy initiator, and about 0.1 to 1 weight percent, monomer basis, of a water-soluble reducing activator to form a polymeric latex having polymer particle diameters ranging between about 200 A. and about 3000 A. and having molecular weights ranging between about 20 million and about 10 billion for the crosslinked polymers and having intrinsic viscosities between about 0.9 and 2.5 for the linear polymers.

2. An aqueous latex of a high molecular weight polymeric product of the group consisting of linear and crosslinked polymers containing combined crosslinking agent containing two vinylidene groups and consisting of at least about 5 weight percent of combined vinylbenzyl halide, halide being a member of the group consisting of chloride and bromide, the balance being at least one monoalkenyl monomer of the group consisting of styrene and monoalkenyl monomers copolymerizable with styrene, said crosslinked polymer additionally containing up to 1 weight percent of combined crosslinking agent containing two vinylidene groups, said polymer having an average particle diameter between about 200 and about 3000 A. and having an average molecular weight for the crosslinked polymers of between about 20 million and about 10 billion and an intrinsic viscosity of about 0.9 to about 2.5 for the linear polymeric products.

3. The products of claim 2, wherein the polymers are those of vinylbenzyl chloride, said crosslinked polymers additionally containing up to about 1 weight percent of divinylbenzene.

4. The products of claim 2, wherein the polymers are those of up to about 50 weight percent of styrene, the balance being vinylbenzyl chloride, said crosslinked polymers additionally containing up to about 1 weight percent of divinylbenzene.

5. The products of claim 2, wherein the polymers are those of about 1 to about 3 weight percent of acrylic acid, the balance being vinylbenzyl chloride, said crosslinked polymers additionally containing up to about 1 weight percent of divinylbenzene.

6. The products of claim 2, wherein the polymers are those of up to about 50 percent of acrylonitrile, the balance being vinylbenzyl chloride, said crosslinked polymers additionally containing up to about 1 weight percent of divinylbenzene.

7. The products of claim 2, wherein the polymers are those of up to about 75 weight percent of methyl acrylate, the balance being vinylbenzyl chloride, said crosslinked polymers additionally containing up to about 1 weight percent of divinylbenzene.

8. The products of claim 2, wherein the polymers are those of up to about 30 percent of acrylamide, the balance being vinylbenzyl chloride, said crosslinked polymers additionally containing up to about 1 weight percent of divinylbenzene.

References Cited in the file of this patent

UNITED STATES PATENTS

| | | |
|---|---|---|
| 2,366,007 | D'Alelio | Dec. 26, 1944 |
| 2,631,127 | D'Aleilio | Mar. 10, 1953 |
| 2,764,560 | McMaster | Sept. 25, 1956 |
| 2,780,604 | Clarke | Feb. 5, 1957 |